United States Patent
Katagiri et al.

(10) Patent No.: US 8,170,386 B2
(45) Date of Patent: May 1, 2012

(54) OPTICAL PULSE GENERATING APPARATUS

(75) Inventors: Takashi Katagiri, Sendai (JP); Toshihiko Ouchi, Sagamihara (JP); Kentaro Furusawa, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 654 days.

(21) Appl. No.: 12/355,310

(22) Filed: Jan. 16, 2009

(65) Prior Publication Data
US 2009/0190893 A1 Jul. 30, 2009

(30) Foreign Application Priority Data
Jan. 29, 2008 (JP) ................... 2008-017843

(51) Int. Cl.
*G02F 1/365* (2006.01)
*H04B 10/12* (2006.01)
(52) U.S. Cl. .......................... 385/122; 398/146; 398/147
(58) Field of Classification Search ................... 385/122
See application file for complete search history.

(56) References Cited

U.S. PATENT DOCUMENTS

| | | | |
|---|---|---|---|
| 5,349,598 A | 9/1994 | Ouchi et al. | |
| 5,594,577 A | 1/1997 | Majima et al. | |
| 5,654,814 A | 8/1997 | Ouchi et al. | |
| 5,742,418 A | 4/1998 | Mizutani et al. | |
| 5,757,828 A | 5/1998 | Ouchi | |
| 6,480,656 B1 * | 11/2002 | Islam et al. | 385/123 |
| 6,597,713 B2 | 7/2003 | Ouchi | |
| 6,813,429 B2 * | 11/2004 | Price et al. | 385/125 |
| 7,151,865 B2 | 12/2006 | Ouchi | |
| 2006/0263024 A1 * | 11/2006 | Dong et al. | 385/125 |

FOREIGN PATENT DOCUMENTS

JP 2711778 2/1998

OTHER PUBLICATIONS

K. Tai et al., "1100 x Optical Fiber Pulse Compression Using Grating Pair and Soliton Effect at 1.319 μm," Applied Physics Letters, vol. 48, pp. 1033-1035 (1986).

* cited by examiner

*Primary Examiner* — Omar Rojas
(74) *Attorney, Agent, or Firm* — Fitzpatrick, Cella, Harper & Scinto

(57) ABSTRACT

Optical pulse compressor having a chirp unit including a normal dispersion fiber that provides a positive chirp to an input pulse and having a dispersion compensator including an anomalous fiber is provided. The nonlinear coefficient and the absolute value of the second-order group-velocity dispersion of the anomalous fiber that forms the dispersion compensator is set such that a soliton order becomes one or more, and the fiber length of the anomalous dispersion fiber is made to be equal to or smaller than a length required for optical soliton formation.

7 Claims, 3 Drawing Sheets

OPTICAL PULSE GENERATING APPARATUS

BACKGROUND OF THE INVENTION

1. Field of the Invention

The present invention relates to an optical pulse compressor, and in particular to an optical pulse compressor used in a light source for generating high-intensity short optical pulses.

2. Description of the Related Art

One of the existing methods for generating high-intensity short optical pulses is a method of compressing optical pulses that are output from various optical pulse sources. There are roughly two kinds of pulse compressors based on the nonlinear effect of an optical fiber.

The first one is a pulse compressor that uses a normal dispersion fiber and a dispersion compensator.

In this case, the normal dispersion fiber has a role of giving a nearly linear positive chirp to an input pulse due to self-phase modulation (SPM) and group velocity dispersion (GVD) effects. An optical pulse, when input to an optical fiber having normal dispersion, is spectrally broadened and is positively chirped over the entire pulse width.

The pulse, after passing through the fiber, is sent to a dispersion compensator having a diffraction grating pair and is compressed due to anomalous GVD. Normal dispersion means that a delay on the time axis is larger for a shorter wavelength, and causing such dispersion is called positive chirping or giving a positive chirp. Anomalous dispersion means that the delay is larger for a longer wavelength. This compressor, using a normal dispersion fiber and a dispersion compensator, will be specifically called a chirp compensation compressor.

The second one is a pulse compressor that uses an anomalous fiber. In this case, an input pulse is compressed due to a soliton effect. A soliton is a phenomenon, or a pulse itself showing the phenomenon, in which the pulse propagates in a fiber without change in waveform because pulse broadening due to the GVD of the fiber balances pulse shortening due to the SPM caused by the anomalousness of the fiber.

Here, a high-intensity optical pulse is compressed during propagation through a fiber since the SPM effect increases with the intensity of the optical pulse. In this case, there is a tendency that the higher the intensity of the input pulse is, the higher the compression factor (input pulse width divided by output pulse width) is. This compressor with an anomalous dispersion fiber will be specifically called a high-order soliton compressor.

A paper by Tai et al. (Applied Phys. Lett., vol. 48, pp. 1034-1035 (1986)) shows that a high compression factor of 1100 is realized by a two-stage compressor that uses the above-described two methods in succession.

This experiment used a 100 ps (picoseconds) input pulse that was generated by a mode-locked neodymium:yttrium aluminum garnet (YAG) laser operating at a wavelength of 1.32 µm (micrometers). The first stage compression of the experiment produced a pulse compressed to a width of 2 ps using the above-described chirp compensation compressor with a normal dispersion fiber and a diffraction grating pair. This pulse was further compressed by the second stage high-order soliton compressor to obtain a resultant output pulse with a pulse width of 90 fs (femtoseconds).

The above described chirp compensation compressor has been favorably used for wavelengths shorter than the zero-dispersion wavelength (approximately 1.3 µm) of bulk quartz. This is because an ordinary quartz optical fiber shows normal dispersion for wavelengths shorter than the zero-dispersion wavelength of bulk quartz. On the other hand, an optical fiber can be realized that shows normal dispersion for wavelengths longer than the zero-dispersion wavelength (approximately 1.3 µm) of bulk quartz, by carefully choosing the material composing the fiber and the refractive index profile. Such an optical fiber can be realized by a fluoride fiber mainly composed of, for example, zirconium tetrafluoride ($ZrF_4$) and hafnium tetrafluoride ($HfF_4$).

By using an optical fiber that shows normal dispersion for wavelengths longer than the zero-dispersion wavelength of bulk quartz, a chirp compensation compressor can be applied to those wavelengths. The advantage of operation in those wavelengths includes realizing a low-cost and stable all-optical-fiber compressor by replacing a diffraction grating pair with a piece of anomalous optical fiber mainly composed of quartz.

SUMMARY OF THE INVENTION

The structure described in the above-described paper (Applied Phys. Lett., vol. 48, pp. 1034-1035 (1986)), has problems. In particular, it is expensive since a diffraction grating pair is used in the first stage chirp compensation compressor, and there is a concern that displacements of the optical axis due to vibrations etc. may cause the entire system to be unstable. Furthermore, in the second stage high-order soliton compressor, an output pulse generally includes pedestals (energy components other than the main pulse). Since the energy of the pedestals given as a percentage of the total pulse energy has a tendency to increase with the intensity of the input pulse, a compressor used for high-intensity input pulses needs further improvement.

In other words, there has been a need for a pulse compressor that has no diffraction grating pair in its dispersion compensator and realizes compression with few pedestals even for an input pulse with high intensity.

An optical pulse compressor according to the present invention includes a chirp unit including a normal dispersion fiber that provides a positive chirp to an input pulse; and a dispersion compensator including an anomalous fiber that compensates the positive chirp provided to the input pulse from the chirp unit. A nonlinear coefficient and an absolute value of a second-order group-velocity dispersion of the anomalous fiber that forms the dispersion compensator is set such that a soliton order becomes one or more, and a fiber length of the anomalous dispersion fiber is equal to or smaller than a length required for optical soliton formation.

According to the optical pulse compressor of the invention, since the fiber length of the anomalous dispersion fiber forming the dispersion compensator is equal to or smaller than a length required for optical soliton formation, and the soliton order is one or more, pulses can be controlled in such a manner that the amount of pedestal components are decreased or suppressed.

Further features of the present invention will become apparent from the following description of exemplary embodiments with reference to the attached drawings.

DESCRIPTION OF THE EMBODIMENTS

Figure 1:
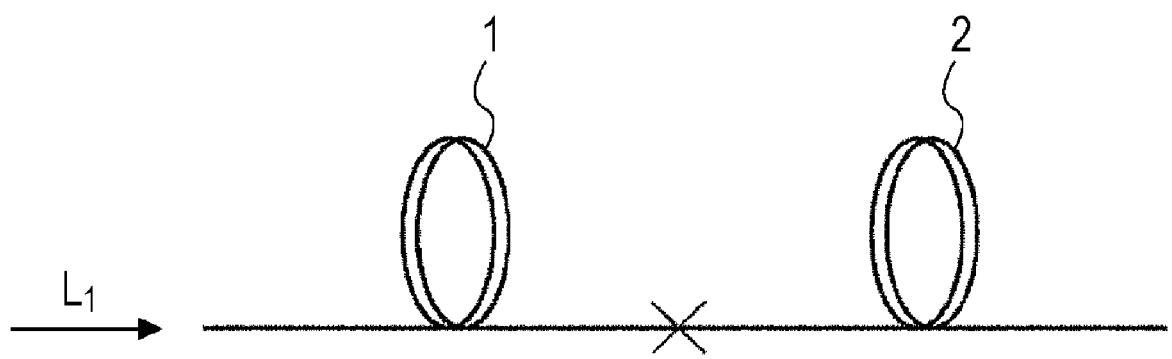
FIG. 1 is a schematic diagram of an optical pulse compressor according to an embodiment of the invention.

First, fundamental parameters related to a compressor and equations showing their relationships with actual physical quantities will be shown. Let the parameters be defined as follows:

$P_0$: initial pulse peak intensity (W)
$T_0$: initial pulse width (ps)
$\beta_2$: second-order group-velocity dispersion (ps²/km)
γ: nonlinear coefficient of an optical fiber ($W^{-1}km^{-1}$)
C: chirp amount (ps²)

Then, dispersion length $L_D$ (km), nonlinear length $L_{NL}$ (km), normalized soliton amplitude A, and soliton order N are respectively given by Equations (1) to (4):

$$L_D = T_0^2/|\beta_2| \quad (1)$$

$$L_{NL} = 1/\gamma P_0 \quad (2)$$

$$A = (\gamma P_0 T_0^2/|\beta_2|)^{1/2} \quad (3)$$

$$N = \text{integer closest to A} \quad (4)$$

An optical pulse compressor according to an embodiment of the invention includes a chirp unit having a normal dispersion fiber that gives a positive chirp to an input pulse, and a dispersion compensator having an anomalous dispersion fiber for compensating the positive chirp of the input pulse provided by the chirp unit.

The nonlinear coefficient and the absolute value of the second-order group-velocity dispersion of the anomalous dispersion fiber that forms the dispersion compensator are set such that the soliton order becomes 1 or more. In addition, the length of the anomalous dispersion fiber is made to be equal to or smaller than the length required for optical soliton formation. As a result, an optical pulse compressor is realized.

The embodiment will now be described with reference to the attached drawings.

FIG. 1 schematically shows an optical pulse compressor according to the embodiment of the invention.

An input pulse $L_1$ is input to a chirp unit 1 and spectrally broadened, and there, is positively chirped over the entire pulse width. The pulse, after passing through the chirp unit, is sent to a dispersion compensator 2, where it is compressed.

Each component of the optical pulse compressor according to the embodiment of the invention will be described in detail below.

The chirp unit 1 used in the present embodiment includes an optical fiber that shows normal dispersion over the whole wavelength range of the input pulse. Examples that can be used as such fibers include a single-mode quartz fiber used for a wavelength of 1.3 μm or less, a dispersion shift fiber used for a wavelength from 1.3 to 1.5 μm, and a fluoride or dispersion compensation fiber used for a wavelength of 1.5 μm or more. To obtain a positive chirp within a fiber, the fiber needs to have a length that is around $L_D$ or $L_{NL}$, or more. Alternatively, an optical fiber having an amplifying function, such as an erbium-doped fiber (EDF), may be used. In this case, a high-intensity parabolic pulse having a linear positive chirp is generated in the normal dispersion rare-earth-doped fiber, due to mutual interaction of the distributed gains between normal GDS and SPM.

The dispersion compensator 2 in the present embodiment is an optical fiber showing anomalous dispersion over the entire wavelength band of the pulse that has been positively chirped by the chirp unit 1. Examples that can be used for such an optical fiber include a single-mode quartz fiber and some low-porosity photonic crystal fibers (PCFs) in the case of a wavelength of 1.3 μm or more; and some high-porosity PCFs in the case of wavelengths less than 1.3 μm.

In the present embodiment, the nonlinear coefficient γ and the second-order group-velocity dispersion $\beta_2$ of the anomalous dispersion fiber that forms the dispersion compensator 2 are set such that the order N of the chirped soliton pulse that is input to the dispersion compensator 2 becomes 1 or more. The reason why N is set to be 1 or more is that an optical soliton described below is not formed when N=0, for example. In other words, an optical soliton is not formed when N=0, because a pulse that is input to a fiber undergoes unbalanced broadening due to GVD and shortening due to SPM caused by the anomalousness of the fiber.

Note that a soliton having a soliton order N=1, is obtained by the following setting, for example: the initial pulse peak intensity $P_0$=5 W, the initial pulse width $T_0$=1 ps, the second-order group-velocity dispersion $\beta_2$=−20 ps²/km, and the nonlinear coefficient of an optical fiber γ=3 $W^{-1}km^{-1}$. Then A=0.866, leading to a resultant N=1.

Figure 2:
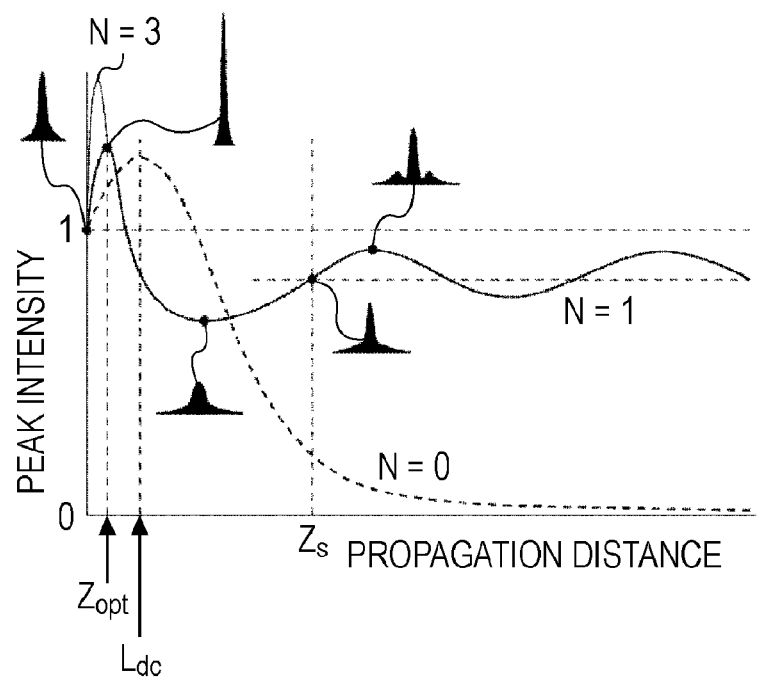
FIG. 2 illustrates variation in pulse peak intensity of positively chirped pulses that propagate through a dispersion compensator, for N=1, 2, and 3.

As an example, FIG. 2 shows how the pulse peak intensity of a positively chirped pulse varies within the dispersion compensator 2, when the pulse is input to the dispersion compensator 2.

Here, the peak intensity (vertical axis) is normalized by the peak power of the input chirped pulse. When the soliton order N=0 (dotted lines in the figure), the chirped pulse is first compressed due to the influence of anomalous GVD of the dispersion compensator 2, and its peak intensity reaches the maximum at propagation distance $L_{dc}$.

Beyond the propagation distance $L_{dc}$, the anomalous GVD negatively chirps the compressed pulse. Hence the pulse is broadened, and its peak intensity decreases and converges to zero. The ranges of the values allowed for the nonlinear coefficient γ of an optical fiber and the second-order group-velocity dispersion $\beta_2$ are determined from the practical point of view, and the value range of the initial pulse width may be appropriately determined. Considering these points, it can be understood from Equation (4) that the initial pulse peak intensity $P_0$ inevitably becomes small when N=0, i.e., the case of N=0 is not suitable for a high-intensity pulse compressor.

Also for N=1, the anomalous GVD of the fiber is at first dominant and works to compensate for the positive chirp, thus compressing the pulse and increasing the peak intensity. Then, the pulse broadens and its peak intensity decreases. However, soon after that, the peak intensity again increases toward forming a soliton, and continues to vary cyclically with propagation distance, leading to the formation of a soliton. Here, a propagation distance $z_s$ at which a cyclical variation starts is defined to be a length required for optical soliton formation.

Note that the center of the cyclical variation of the peak intensity after forming an optical soliton is smaller than one. This is because part of the pulse energy is separated from the main peak during the process in which the chirped pulse evolves into an optical soliton. The part of the pulse energy thus separated propagates in the form of pedestals at the base of the main peak. The length $z_s$ required for optical soliton formation is a propagation distance at which the pulse having a single peak changes into a pulse having three peaks or more due to the formation of pedestals. To obtain a high-quality pulse with few pedestals, the length of an anomalous fiber forming the dispersion compensator 2 is desirably made equal to or more desirably less than the length $z_s$ required for optical soliton formation.

Since an optical soliton is generally stable for small perturbations, an optical soliton is not formed when a chirped pulse that is input to the dispersion compensator 2 has a large chirp amount C. In this case, a chirped pulse cannot maintain a pulse shape with a single peak, thus making compression difficult. Hence, the chirp parameter C of a chirped pulse that is input to the dispersion compensator 2 needs to be smaller than a critical value $C_{cr}$. The critical value $C_{cr}$ of the chirp parameter, which depends on N, has a tendency to increase in accordance with N.

FIG. 2 shows that a fiber length of the dispersion compensator 2 that allows the maximum compression factor with no pedestal corresponds to a minimum possible propagation distance $z_{opt}$ at which the peak intensity becomes locally maximal. This optimum fiber length $z_{opt}$ of the dispersion compensator 2, which is determined by the balance between the GVD and SPM of the fiber, is a length which is shorter than the optimum length $L_{dc}$ in the figure for N=0, and which corresponds to a propagation distance at which the peak intensity becomes locally maximal. Here, $L_{dc}$ is given by the following equation using a chirp amount C and second-order group-velocity dispersion $\beta_2$.

$$L_{dc} = -C/\beta_2 \qquad (5)$$

Note that $z_{opt}$ can be actually obtained using a cutback technique from $L_{dc}$ given by Equation (5).

Thus, by making the fiber length of the dispersion compensator 2 be a length which is shorter than the optimum length $L_{dc}$ at N=0 and which makes the peak intensity become locally maximal, as described above, an optimum fiber length shortened due to SPM is determined. Consequently, the maximum possible compression factor can be realized avoiding the generation of pedestals.

The behavior of a pulse within the dispersion compensator 2 for N>1 is complex, but is similar to the case of N=1 in the initial stage. FIG. 2 shows that the optimum fiber length shortens and the corresponding peak intensity increases as N increases. This is because the compression effect is further enhanced by the broadening of the spectrum due to the influence of SPM in the dispersion compensator 2. The soliton order N applicable to the invention may be N=1, and in addition, N=2, 3, or more. The upper limit of the soliton order is, for example, 150 or less and desirably 10 or less in view of a threshold where induced Raman scattering is generated.

The dispersion compensator may be formed of a single anomalous dispersion fiber, or may be formed of anomalous dispersion fibers of different kinds without any restriction, as long as they function as the dispersion compensator in the embodiments of the invention as a whole.

Furthermore, an optical pulse generator may also be realized by combining the above-described optical pulse compressor and an optical pulse source. In this case, output pulses from, for example, a femtosecond laser source can be compressed while pedestals are suppressed, allowing the generation of ultra-short pulses having few pedestals.

Figure 3:
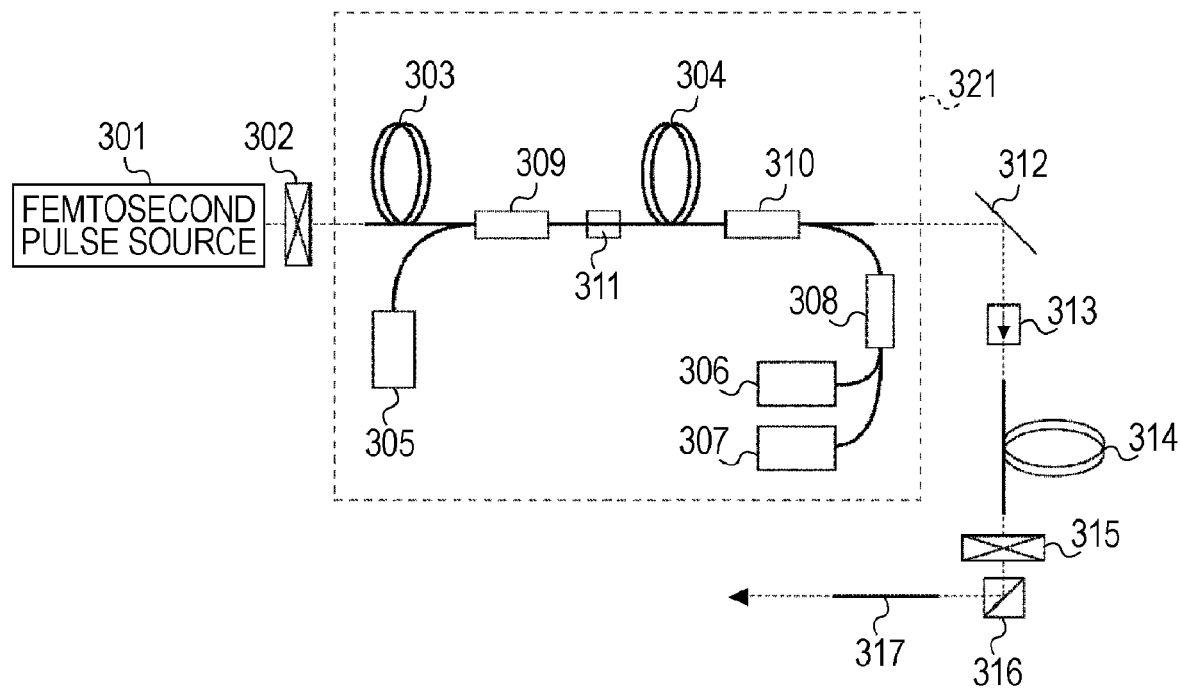
FIG. 3 is a schematic diagram of an optical pulse generator according to another embodiment of the invention.

FIG. 3 schematically shows an optical pulse generator according to another embodiment of the invention.

For simplicity, a coupling portion such as a lens is not shown in FIG. 3. Referring to this figure, the optical pulse generator of the present embodiment includes a first compressor having a chirp unit 321 and a dispersion compensator 314, and a second compressor having a highly nonlinear fiber (HNLF) 317. In other words, short optical pulses output from a femtosecond pulse generator 301 are compressed in two stages. Note that the second compressor is provided as required in the present embodiment of the invention.

The femtosecond pulse generator 301 is an erbium fiber laser that cyclically generates short optical pulses having a central wavelength of approximately 1560 nm and a pulse width of approximately 300 fs, at a frequency of 48 MHz. The average power is approximately 5 mW. For efficient compression in the later compression process, it is desired that the pulses of the femtosecond pulse generator 301 have a hyperbolic secant (sech) shape with a single peak in the time domain, and have quality close to the Fourier transform limit. Initial pulses output from the femtosecond pulse generator 301 are input to the chirp unit 321 through polarization adjustment using a $\lambda/2$ wavelength plate 302.

The chirp unit 321 includes a prechirp single-mode fiber 303 and an EDF 304. In the present embodiment, using the EDF 304 together with normal GVD and SPM allows the generation of a linear and positively chirped parabolic pulse, which is easily compensated by the dispersion compensator 314 later. The input pulse is elongated within the prechirp single-mode fiber 303 due to the influence of anomalous GVD. Hence, the pulse peak intensity is temporarily limited, and excessive nonlinear-effect within the EDF 304 is controlled, leading to effective amplification. The length of the prechirp single-mode fiber 303 needs to be carefully determined to realize ideal operations of the EDF 304. For example, the prechirp single-mode fiber 303 having a length of approximately 4.5 m is expected to be appropriate.

The pulse that has been elongated in time within the prechirp single-mode fiber 303 is input to the EDF 304, which has a length of 6 m. The pulse is input to the EDF 304 through a polarization controller 311, which adjusts the polarization. In the configuration of FIG. 3, the EDF 304 is excited by three semiconductor lasers 305 to 307 that are connected via wavelength division multiplexing (WDM) couplers 309 to 310 and a polarization beam combiner 308. The wavelength and intensity of the semiconductor lasers 305 to 307 are 1480 nm and 400 mV, respectively.

According to the present embodiment, a 760 fs wide chirped pulse having approximately linear positive chirp over the entire pulse is expected at the output of the chirp unit 321 in FIG. 3. The chirp amount C is 0.014 ps$^2$ in this case.

The chirped pulse from the chirp unit 321 is compressed due to the influence of anomalous GVD in the dispersion compensator 314.

In the present embodiment, a large-mode-area photonic crystal fiber (LMA-PCF) is used as the dispersion compensator 314. The LMA-PCF is a fiber that allows single-mode propagation, even though it has a mode-field diameter as large as 26 μm. Hence, the influence of the high-order nonlinear effect unfavorable for dispersion compensation is decreased. Here, the second-order group-velocity dispersion $\beta_2$ and the nonlinear coefficient $\gamma$ are −30.3 ps$^2$/km and 0.182 W$^{-1}$km$^{-1}$, respectively. The nonlinear coefficient $\gamma$ of the dispersion compensator 314 is desirably 0.5 W$^{-1}$km$^{-1}$ or less. By making the nonlinear coefficient $\gamma$ small, the unfavorable effect of high-order nonlinearity decreases, and hence, an unfavorable frequency shift and collapse of a pulse can be prevented.

In the present embodiment, since there is a large difference in mode field diameter between the fiber of the WDM coupler at the output end of the chirp unit 321 and the LMA-PCF, a chirped pulse is input to the LMA-PCF, which is the dispersion compensator 314, through an isolator 313. By performing input through the isolator 313, the unfavorable reverse influx of reflected light into the EDF 304 due to a mode mismatch can be prevented. In the present embodiment, a chirped pulse at the output of the isolator 313 is expected to have a pulse intensity of 390 mW.

The soliton order N of a chirped pulse that is input to the dispersion compensator 314 is 5 as given by Equation (4). From Equation (5), the optimum fiber length $L_{dc}$ is calculated to be 46 cm assuming N=0. Hence, the optimum length $z_{opt}$ of the LMA-PCF is calculated to be approximately 42 cm, using a cutback method starting with an initial fiber length of $L_{dc}$. Note that reference numeral 312 in FIG. 3 denotes a mirror.

Figure 4:
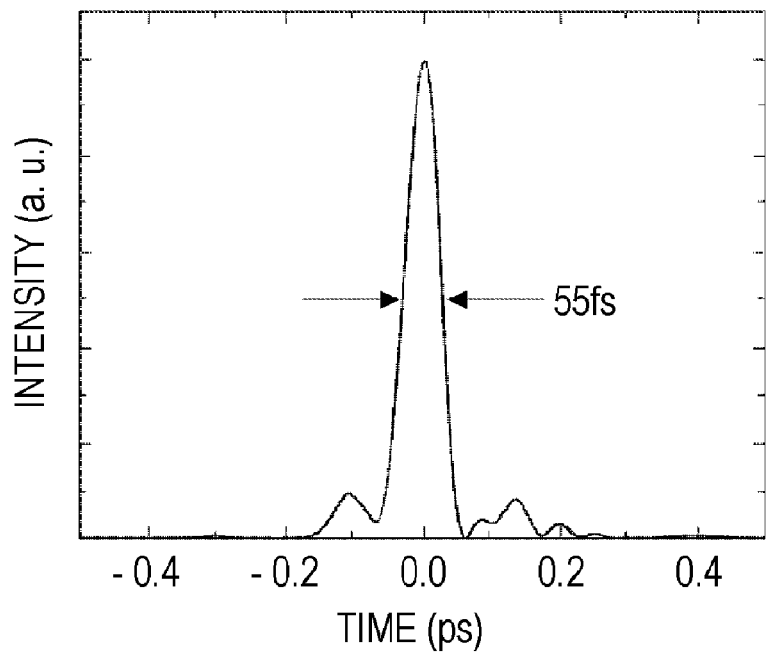
FIG. 4 illustrates a time shape of an output pulse of a dispersion compensator 314 of FIG. 3.

FIG. 4 shows a time shape of a pulse at the output of the dispersion compensator 314 of the present embodiment. As shown in the figure, a pulse having few pedestals and having a pulse width of 55 fs and a pulse intensity of 280 mW can be expected by the present embodiment.

Figure 5:
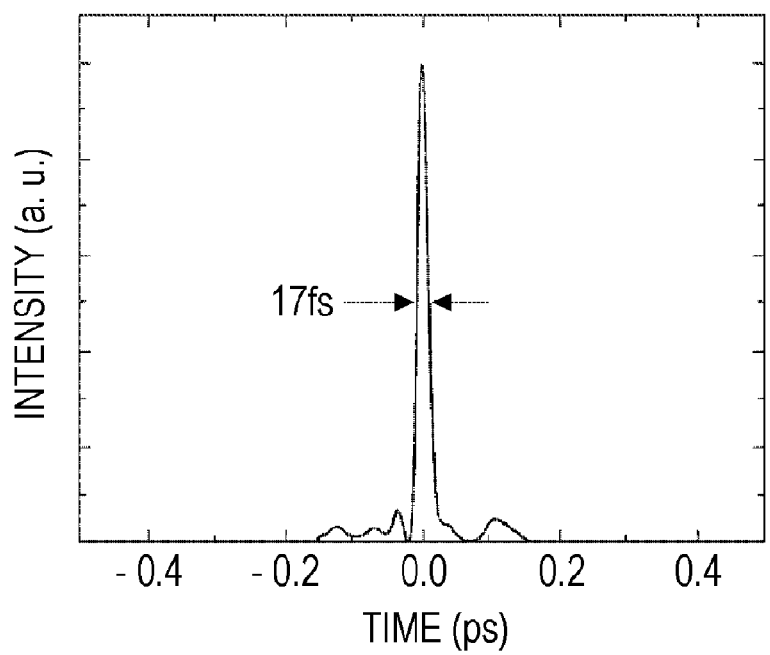
FIG. 5 illustrates a time shape of an output pulse of a second compressor 317 of FIG. 3.

The pulse of FIG. 4 is further compressed by passing it through the second compressor formed of the highly nonlinear fiber (HNLF) 317. The pulse input to the HNLF 317 is linearly polarized by a λ/2 wavelength plate 315 and a polarizing beam splitter 316. FIG. 5 shows a pulse shape after the recompression by the HNLF 317 having a length of 1.5 cm. Through the two-stage configuration, a resultant ultra-short pulse with a pulse width of 17 fs having few pedestals can be produced. Thus, a higher compression factor can be realized using the first and second compressors.

Japanese Patent No. 2711778 describes a chirp compensation compressor formed of a normal dispersion fiber and an anomalous dispersion fiber. It can be said that this compressor has a soliton order N=0, since the intensity of input pulses is attenuated to such a level as to suppress SPM in the dispersion compensator.

Since the SPM in the dispersion compensator is negligible in this case, pulse compression is easily realized using an anomalous fiber having an optimum length $L_{dc}$ that is calculated from Equation (5). However, the nonlinear coefficient γ of the dispersion compensator formed of optical fibers is finite and a second-order group-velocity dispersion $β_2$ also has an upper limit. Hence, when the input pulses have a high intensity (for example, a peak intensity of 10 kw or higher), it is difficult to maintain the soliton order N=0 without attenuating the pulse intensity. Thus, the technology described in Japanese Patent No. 2711778 is unsuitable for a compressor for high-intensity pulses.

Even when the chirp compensator in Japanese Patent No. 2711778 is used for the two-stage compressor of the above-described paper (Applied Phys. Lett., vol. 48, pp. 1034-1035 (1986)), the chirp compensation compressor in the first stage limits the pulse intensity. For this reason, the high-order soliton compressor in the second stage will not have effective compression, i.e., a sufficiently large compression factor is not obtained as a whole.

As described above, an optical pulse generator according to the present embodiment can produce high-intensity ultra-short pulses having few pedestals. This is enabled mainly by utilizing a state in which GVD is dominant during the course of forming a soliton in the first stage compressor. This allows a multi-stage compression while always suppressing pedestals, leading to the formation of an ultra-short pulse having a width equal to or less than 20 fs using a favorable all-fiber system.

An optical pulse compressor according to the invention can be applied to an optical source for generating teraherz pulses.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2008-017843, filed Jan. 29, 2008, which is hereby incorporated by reference herein in its entirety.

What is claimed is:

1. An optical pulse generating apparatus for outputting an ultrashort pulse, the apparatus comprising:
   an optical pulse source; and
   an optical pulse compressor that compresses an input pulse from the optical source, comprising:
      a chirp unit comprising a normal dispersion fiber that provides a positive chirp to the input pulse, and
      a dispersion compensator comprising an anomalous fiber that compensates for the positive chirp provided to the input pulse from the chirp unit,
   wherein a nonlinear coefficient and an absolute value of a second-order group-velocity dispersion of the anomalous fiber of the dispersion compensator is set such that a soliton order becomes one or more, and a fiber length of the anomalous fiber is equal to or smaller than a length required for optical soliton formation, and
   wherein a nonlinear coefficient of the dispersion compensator is 0.5 $W^{-1}cm^{-1}$ or less.

2. The optical pulse generating apparatus according to claim 1, wherein the fiber length of the anomalous fiber forming the dispersion compensator is shorter than a fiber length that makes a peak intensity of a pulse within the dispersion compensator become locally maximal for a soliton order of 0, and
   wherein the fiber length of the anomalous fiber forming the dispersion compensator is set such that the peak intensity of a pulse that is output from the dispersion compensator becomes locally maximal.

3. The optical pulse generating apparatus according to claim 1, wherein the normal dispersion fiber forming the dispersion compensator is a rare-earth-doped fiber.

4. The optical pulse generating apparatus according to claim 1, wherein the chirp unit and the dispersion compensator form a first compressor, and the optical pulse compressor further comprises a second compressor formed of another anomalous fiber.

5. The optical pulse generating apparatus according to claim 1, wherein the optical pulse compressor does not include a diffraction grating.

6. The optical pulse generating apparatus according to claim 1, wherein the dispersion compensator does not include a diffraction grating.

7. The optical pulse generating apparatus according to claim 1, wherein a chirp parameter of the input pulse, input to the dispersion compensator, is smaller than a critical value.

* * * * *